United States Patent [19]

Nelson

[11] Patent Number: 5,540,084
[45] Date of Patent: Jul. 30, 1996

[54] VACUUM SYSTEM TESTING TOOL

[75] Inventor: Edward M. Nelson, Franklin, Wis.

[73] Assignee: Outboard Marine Corporation, Ill.

[21] Appl. No.: 322,207

[22] Filed: Oct. 13, 1994

[51] Int. Cl.$^6$ .................................................. G01M 3/04
[52] U.S. Cl. ........................................................ 73/49.2
[58] Field of Search .......................... 73/49.2 R, 3, 1 G

[56] References Cited

U.S. PATENT DOCUMENTS

| | | |
|---|---|---|
| 949,640 | 2/1910 | Westcott ........................................ 73/3 |
| 1,055,343 | 3/1913 | Mark . |
| 1,116,720 | 11/1914 | McGuire . |
| 1,186,558 | 6/1916 | Dunn . |
| 1,237,092 | 8/1917 | Preston . |
| 1,489,761 | 4/1924 | Heidbrink . |
| 4,272,985 | 6/1981 | Rapson, Jr. et al. ...................... 73/49.2 |

*Primary Examiner*—Hezron E. Williams
*Assistant Examiner*—Jay L. Politzer
*Attorney, Agent, or Firm*—Greer, Burns & Crain, Ltd.

[57] ABSTRACT

A vacuum system testing tool for checking a vacuum system for leaks or restrictions includes a hollow housing defining a central chamber, with a calibrated air flow orifice, a connector for connecting the tool to the system to create a pressure drop across the air flow orifice, and a device for measuring the pressure drop.

15 Claims, 2 Drawing Sheets

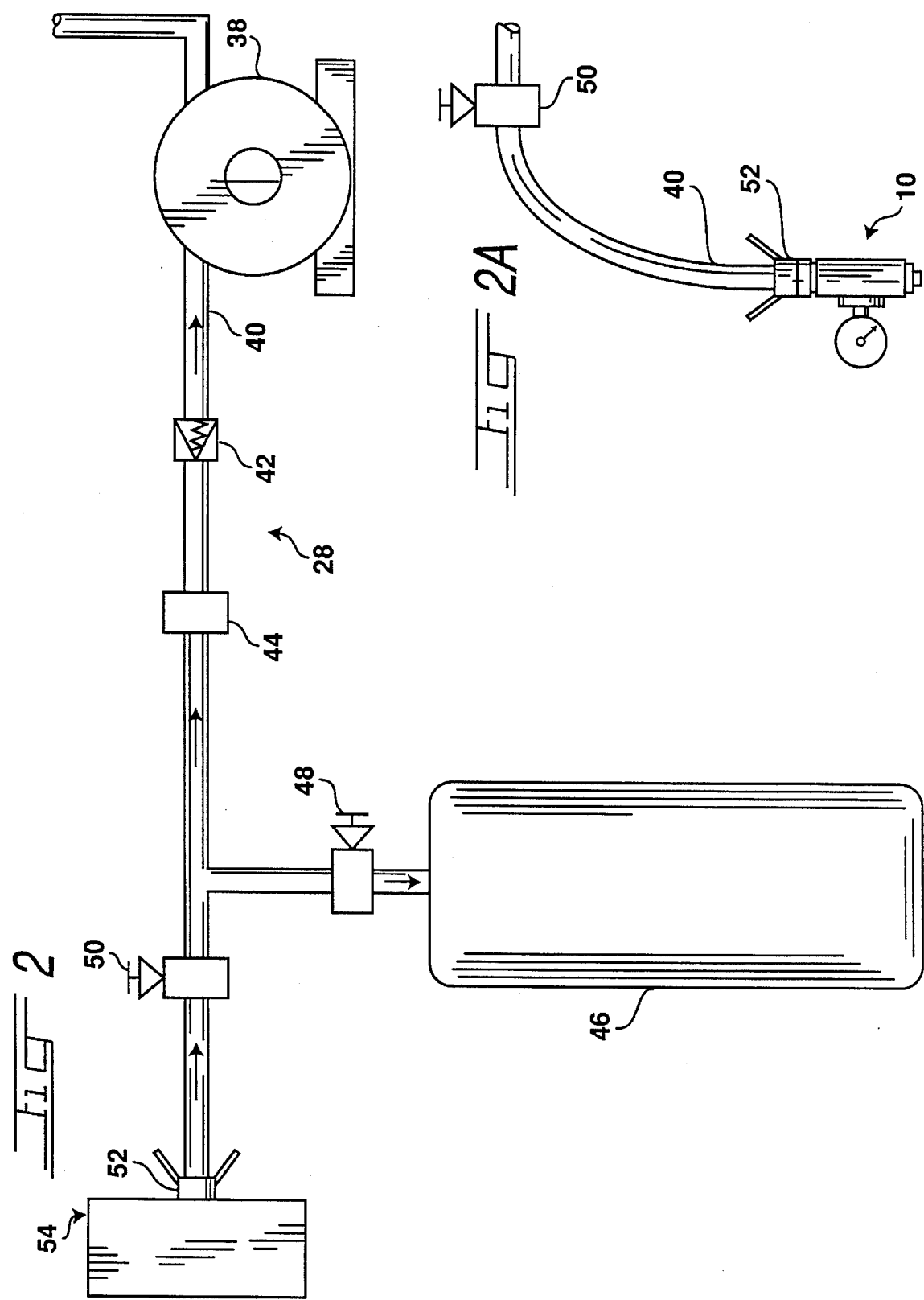

VACUUM SYSTEM TESTING TOOL

BACKGROUND OF THE INVENTION

The present invention relates generally to devices used for testing vacuum systems for leaks or restrictions. More particularly, the present invention relates to devices which can be inserted in a vacuum system and which measure the vacuum pressure at a flow rate generally equal to the flow rate of the vacuum system running at operating conditions.

Vacuum systems are currently in wide-spread use throughout the die casting industry. A vacuum system is attached to a die casting machine to reduce casting porosity caused by trapped gas. This is accomplished by drawing the air out of vacuum lines and die cavity, which creates a vacuum at the cavity opening. Casting material is placed in the opening, and the machine plunger then forces the material into the cavity.

Vacuum systems are generally made up of a vacuum pump, an air-tight holding tank and a series of lines, valves and filters. When the vacuum pump is running, air flows freely through the system. The flow rate is determined by the vacuum pump, line size, die cavity size and die parting lines.

When leaks or restrictions develop in a vacuum system, the flow rate decreases and the vacuum die casting process is not properly applied. The resulting castings are of inferior quality. Without proper vacuum at the die cavity, the casting material can trap air or gas in the mold. In order to correct the problem, the die casting machine must be shut down and the leak or restriction must be isolated and fixed before production can continue. Any component of a vacuum system can become restricted, and therefore it is very difficult to isolate which component is responsible for the problem.

Currently, troubleshooting a problem in a vacuum system is accomplished by attaching a vacuum gauge at the point where the vacuum system attaches to the die block. Static pressure in the lines is then measured to determine if the problem is in the vacuum system or the die casting machine. If the problem is in the vacuum system, parts must be replaced one by one until the system is operating properly, or the entire system must be dismantled and inspected in order to find the problem.

One disadvantage of the current tools and methods of troubleshooting a vacuum system is that only static pressure in the lines is measured. The vacuum system is never tested while running at actual operating conditions.

Another disadvantage of current vacuum system troubleshooting tools and methods is that it is often difficult to isolate the exact location of a problem. Also, the current tools are hard to install and cannot be used to help pinpoint faulty components.

Yet another disadvantage of current tools and methods is that they are often inaccurate. Often leaks or restrictions are not readily apparent, or the system is misdiagnosed as having leaks or restrictions which it does not actually have.

Still another disadvantage of the current tools and methods is that they are not specially tuned for the vacuum system they are made to troubleshoot. This makes it difficult to determine where the problem is, and often leads to misdiagnosis of the problem.

Thus, it is an object of the present invention to provide an improved vacuum system testing tool and method which checks the line pressure of a vacuum system running at actual operating conditions.

It is another object of the present invention to provide an improved vacuum system testing tool and method which will decrease the down time of die casting systems by making it easier to locate and fix faulty components of the system.

It is yet another object of the present invention to provide an improved vacuum system testing tool and method which is more accurate than previous tools and methods.

It is still another object of the present invention to provide an improved vacuum system testing tool and method which is specially tuned for the vacuum system in which it is used.

Other features and advantages of the present vacuum system testing tool will be apparent from the following description taken in conjunction with the accompanying drawings.

SUMMARY OF THE INVENTION

The above-identified objects are met or exceeded by the present vacuum system testing tool and method. A device for measuring a pressure drop, such as a vacuum gauge, is operably connected to a hollow housing defining a central chamber having a specially calibrated orifice and a connector for connecting the tool to a vacuum system. The tool is installed in a working vacuum system to check for leaks or restrictions in the system. The orifice reads from the atmosphere, and when installed in a system, a pressure drop is created across the orifice. The pressure drop at the orifice simulates the pressure drop of a running system. The chamber provides a uniform pressure signal which is measured with a vacuum gauge. Leaks or restrictions show up as incorrect (lower than normal) readings. The tool measures the pressure drop across the orifice in a vacuum system running at actual operating conditions. Air flows from the atmosphere, through the orifice, into the central chamber, through the connection and into the vacuum system. The orifice is specially calibrated to simulate the air flow rate of the vacuum system connected to a die casting machine and running at approximately 100% capacity.

More specifically, the present vacuum system testing tool includes a hollow housing defining a central chamber having an orifice end and a connecting end, a calibrated air-flow orifice located at the orifice end, a connector for connecting the connecting end to the vacuum system to create a pressure drop across the air flow orifice, and a measuring device connected to the housing for measuring the pressure drop.

In the preferred embodiment, the tool contains a camlock-type quick connect fitting so that it can be quickly installed into the vacuum system. This fitting allows the tool to be installed in place of the vacuum valve for system and pump performance testing.

BRIEF DESCRIPTION OF THE DRAWINGS

FIG. 2 is a schematic diagram of a vacuum system suitable for use with the present testing tool, shown attached to a die casting machine; and FIG. 2a is a enlarged view of the present invention installed in a vacuum system.

DETAILED DESCRIPTION OF THE PREFERRED EMBODIMENT

Figure 1:
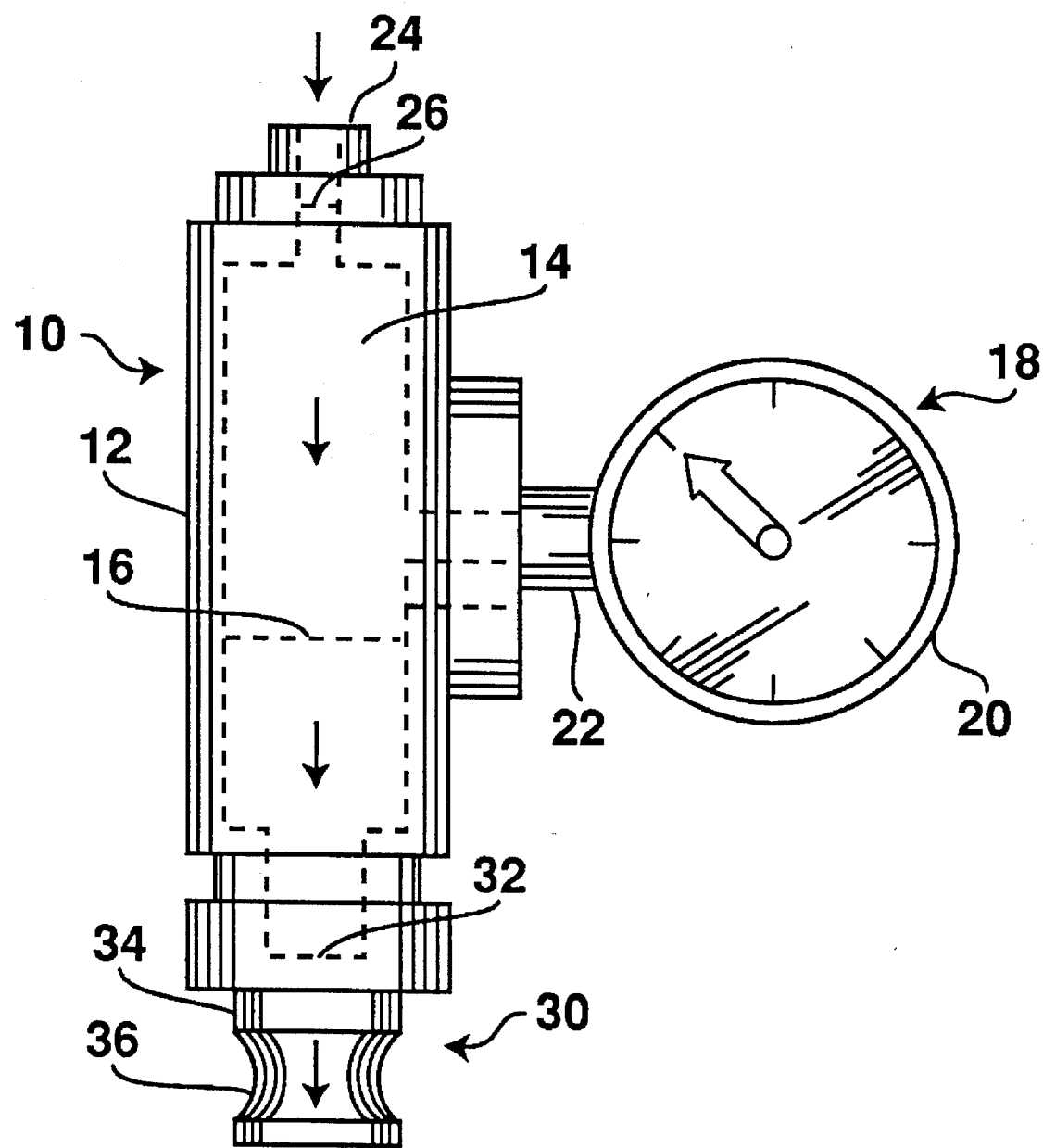
FIG. 1 is a side elevational view of the present vacuum system testing tool.

Referring now to the drawings, the present vacuum system testing tool is generally designated 10. The testing tool 10 consists of a barrel-shaped, hollow housing 12 defining a central chamber 14 with a chamber interior cross-section 16. A vacuum gauge 18 having a dial 20 and a stem 22 is operably connected to, and is in fluid communication with the central chamber 14. An orifice 24 is located in the housing 12 and is also in fluid communication with the central chamber 14. The vacuum gauge 18 is used for measuring the pressure drop created across the orifice 24 when the testing tool 10 is installed in a running vacuum system 28 (best seen in FIG. 2). The orifice 24 has an orifice interior cross-section 26. The orifice 24 is specially calibrated to create the pressure drop which simulates the pressure drop of a vacuum system 28 running at operating conditions. The orifice 24 is designed to communicate with the atmosphere to simulate the operation of the vacuum system 28 when attached to a die casting machine 54.

When the vacuum system 28 is running and connected to the die casting machine 54, air flows through the vacuum system 28 from the die cavity (not shown) to the vacuum pump 38 at an air flow rate determined by the sizes of the vacuum pump 38 and vacuum line 40. Similarly, when the vacuum system 28 is running and the testing tool 10 is connected to the system, air is drawn from the atmosphere, through the orifice 24 and into the central chamber 14. This creates a pressure drop at the orifice 24. The pressure drop is measured by the vacuum gauge 18, and the readings are compared to expected values to determine if the problem is in the die casting machine 54 or the vacuum system 28. A lower than expected pressure reading at the testing tool 10 indicates a problem in the vacuum system 28. A normal reading at the testing tool 10 indicates a problem in the die casting machine 54.

The central chamber 14 also contains a camlock-type quick connect fitting generally designated 30, used for connecting the tool 10 to the vacuum system 28. The quick connect 30 contains a connection interior cross-section 32. The quick connect fitting 30 is made up of a connection stem 34 which contains a radiused recess or neck 36 which is a male-type connector designed to be inserted into a 2-handled, female-type quick connect fitting 52 (best seen in FIG. 2). With the quick connect fitting 30 on the testing tool 10, the testing tool is quickly and easily installable in the vacuum system 28.

When installed in the vacuum system 28, the orifice interior cross-section 26 is dimensioned to produce an air flow rate generally equal to the flow rate of the vacuum system when operating at 100% capacity. The orifice interior cross-section 26 is derived experimentally from testing the tool 10 with new vacuum system equipment. The chamber interior cross-section 16 and the connection interior cross-section 32 are calibrated to provide a uniform pressure signal from the orifice 24, the vacuum gauge 18 and the quick connect 30. In the preferred embodiment, the minimum ratio of the chamber interior cross-section 16 to the orifice interior cross section 26 is about 40 to 1. The preferred minimum ratio of the connection interior cross-section 32 to the orifice interior cross section 26 is about 17 to 1.

Referring now to FIGS. 2 and 2A, the vacuum system 28 consists of a vacuum pump 38, a vacuum line 40, a check valve 42, a filter 44, a holding tank 46, solenoid valves 48 and 50 and the machine connection 52. The vacuum line 40 is used to connect the various components in the vacuum system 28. The vacuum pump 38 is connected to a check valve 42 with vacuum line 40. The vacuum line 40 also connects the check valve 42 with the filter 44, designed to keep dust and other particles from entering the vacuum pump 38. The solenoid valves 48 and 50 are connected to the filter 44 in parallel, with the solenoid 48 isolating the holding tank 46 and the solenoid 50 isolating the machine connection 52, which is the preferred embodiment. A die casting machine 54 or another apparatus is generally connected to the vacuum system 28 at the machine connection 52, which in the preferred embodiment is a two-handled, female-type camlock quick connect.

In operation, the vacuum system 28 is connected to the die casting machine 54. When the vacuum pump 38 is running, air is drawn out of the die casting machine through the vacuum line 40 toward the vacuum pump 38, creating a vacuum at the die cavity (not shown). Casting material is placed at the opening of the die cavity and the atmospheric pressure then forces the material into the cavity.

As mentioned before, the orifice interior cross-section 26 is calibrated to produce a flow rate generally equal to the flow rate of the vacuum system 28 when operating at 100% capacity. The flow rate is determined by the relative sizes of the vacuum pump 38 and the vacuum line 40. Therefore, the orifice interior cross-section 26 varies with the size of the vacuum pump 38 and vacuum line 40.

When troubleshooting the vacuum system 28, the machine connection 52 is removed from the die casting machine 54 and the testing tool 10 is connected to the vacuum system 28 at the machine connection 52 by inserting the male-type quick connect 30 into the female-type machine connection 52. The quick connect fitting 30 makes the testing tool 10 easily installable into the machine connection 52. The vacuum pump 38 is then run at approximately 100% capacity. With the vacuum system 28 operating at about 100% capacity, air flows through the vacuum lines 40 toward the vacuum pump 38. With the testing tool 10 installed at the machine connection 52, the orifice 24 reads from the atmosphere. Air flows from the atmosphere through the orifice 24, into the central chamber 14, through the quick connect 30 and into the vacuum system 28. A pressure drop is created at the orifice 24 and the central chamber 14 provides a uniform pressure signal to be measured by the vacuum gauge 18. Readings are taken from the vacuum gauge 18 and compared to expected values. Readings lower than the expected value indicate vacuum system problems.

For example, a 7½ Hp. vacuum pump with a 102 cfm free-flow capacity could be used to create a vacuum system with a flow rate of 4.7 scfm running at 100% capacity. The expected vacuum gauge reading of this system would be approximately 25" to 27" Hg. With leaks in the vacuum system 28 there could still be 25" to 27" Hg of pressure at the vacuum pump 38 but only 5" to 15" Hg at the testing tool 10.

By isolating the problem to either a leak in the vacuum system 28 or a faulty vacuum pump 38, it is easier to find and fix the actual faulty component. Subsequently, the down time of the die casting system is reduced. Similarly, by specially calibrating the testing tool 10 to the vacuum system 28, the testing tool 10 produces a more accurate reading. This reduces the likelihood of misdiagnosis of vacuum system problems, increasing the likelihood that the die casting system will be fixed properly the first time.

While a particular embodiment of the vacuum system testing tool has been shown and described, it will be appreciated by those skilled in the art that changes and modifications may be made thereto without departing from the invention in its broader aspects and as set forth in the following claims.

What is claimed is:

1. A vacuum system testing tool for checking a vacuum system of a die casting apparatus for leaks or restrictions, the vacuum system having a line with an expected air-flow rate during normal operation of said system at a known capacity, the testing tool comprising:

a hollow housing defining a central chamber having an orifice end and a connecting end;

an air-flow orifice located at said orifice end and in fluid communication with said chamber, said orifice being dimensioned to produce an air flow rate which is approximately equal to the air flow rate in said line of said vacuum system when operating at said known capacity when said tool is installed in said line of the vacuum system;

means for quickly and releasably connecting said connecting end to the vacuum system, so as to create a pressure drop across said air-flow orifice; and means for measuring said pressure to determine whether said pressure is different from the pressure that is expected to be produced when said system is operated at said known capacity.

2. The vacuum system testing tool as defined in claim 1, wherein said means for connecting is a CAMLOCK-type quick connect fitting.

3. The vacuum system testing tool as defined in claim 2, wherein said quick connect fitting is a male-type fitting having a stem containing a radiused recess designed to interface with a female-type fitting.

4. The vacuum system testing tool defined in claim 1, wherein said means for measuring is a pressure gauge operably connected to said central chamber and in fluid communication therewith to provide a pressure reading.

5. The vacuum system testing tool as defined in claim 4, wherein said pressure gauge contains a stem for connecting said pressure gauge to said chamber and a dial for displaying said pressure reading.

6. A vacuum system testing tool for checking a vacuum system of a die casting apparatus for leaks or restrictions, the vacuum system having an expected air-flow rate during normal operation at a known capacity and containing a vacuum pump, a vacuum line and a machine connection for connecting the vacuum line to a die casting machine, the testing tool comprising:

a hollow housing defining a central chamber having an orifice end and a connecting end;

an air-flow orifice located at said orifice end and in fluid communication with said chamber, said orifice being dimensioned to produce an air flow rate which is approximately equal to the air flow rate in said line of said vacuum system when operating at said known capacity when said tool is installed in said line of the vacuum system;

means for quickly and releasably connecting said connecting end to the machine connection of the vacuum system, so as to create a pressure drop across said air-flow orifice when the machine connection is disconnected from the die casting machine and the vacuum pump is running; and means for measuring said pressure to determine whether said pressure is different from the pressure that is expected to be produced when said system is operated at said known, capacity.

7. The vacuum system testing tool as defined in claim 6, wherein said means for connecting is a CAMLOCK-type quick connect fitting.

8. The vacuum system testing tool defined in claim 6, wherein said means for measuring is a pressure gauge which is operably connected to said central chamber and in fluid communication therewith said pressure gauge providing a pressure reading.

9. The vacuum system testing tool as defined in claim 8, wherein said pressure gauge contains a stem for connecting said pressure gauge to said chamber and a dial for displaying said pressure reading.

10. The vacuum system testing tool as defined in claim 7, wherein said quick connect fitting is a male-type fitting having a stem containing a radiused recess designed to interface with a female-type fitting.

11. A method for testing for leaks in a vacuum system having a vacuum pump, a vacuum line an apparatus connection for connecting the vacuum line of the vacuum system to a die casting apparatus, and a known air flow rate when the vacuum pump is running at a known capacity, the method comprising:

disconnecting the apparatus connection from the die casting apparatus;

connecting a vacuum system testing tool into the apparatus connection, said vacuum system testing tool having a hollow housing defining a central chamber containing an orifice end and a connecting end, an air-flow orifice located at said orifice end, means for quickly and releasably connecting said connecting end to the vacuum system so as to create a known pressure drop across said air-flow orifice when the vacuum pump is running and means for measuring said pressure drop, said orifice being dimensioned to produce a predetermined air flow rate when said tool is installed in said line of the vacuum system, which is approximately equal to the air flow rate in said line of said vacuum system when operating at said known capacity;

running the vacuum pump at said known capacity;

measuring said pressure drop across said orifice; and comparing said measured pressure drop to the value of the pressure drop that would be produced as a result of said air flow rate produced by said vacuum system operating at said known capacity to determine if the vacuum system is operating properly.

12. The method as defined in claim 11, wherein the apparatus connection is a female, CAMLOCK-type quick connect fitting and the means for connecting is a male, CAMLOCK-type quick connect fitting of a size suitable for interfacing with the apparatus connection.

13. The method as defined in claim 11, wherein the means for measuring said pressure drop is a pressure gauge which provides a pressure reading, said gauge being operably connected to said central chamber and in fluid communication therewith.

14. The method for testing for leaks in a vacuum system as defined in claim 13, wherein said vacuum gauge contains a stem for connecting said vacuum gauge to said chamber and a dial for displaying said pressure reading.

15. The method for testing for leaks in a vacuum system as defined in claim 12, wherein said male, quick connect fitting has a stem containing a radiused recess designed to interface with a female-type fitting.

* * * * *